June 23, 1964 H. C. DE WITT 3,138,769
DRIVE MEANS FOR SECTORS OF STEP TWIST ROTARY JOINT
Filed Sept. 28, 1962 2 Sheets-Sheet 1

INVENTOR.
H. CLINTON DE WITT
BY
Arthur L. Collins
ATTORNEY

June 23, 1964  H. C. DE WITT  3,138,769
DRIVE MEANS FOR SECTORS OF STEP TWIST ROTARY JOINT
Filed Sept. 28, 1962  2 Sheets-Sheet 2
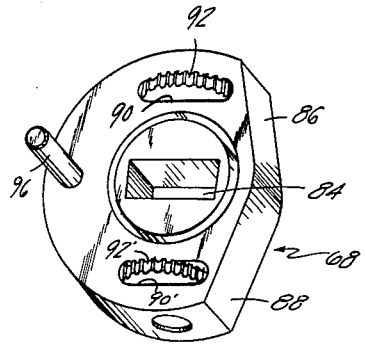
Fig. 4
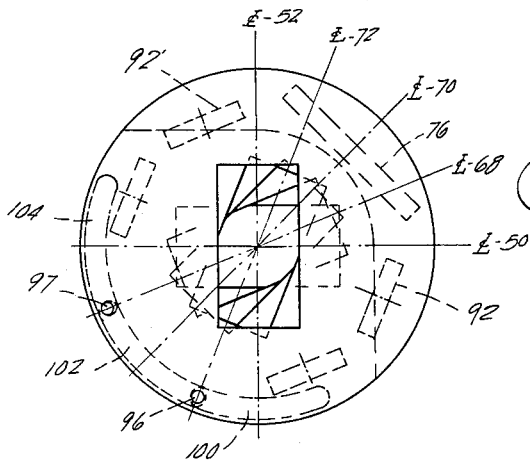
Fig. 5
Fig. 6
| FREQ | VSWR AT | | | | | | | | |
|---|---|---|---|---|---|---|---|---|---|
| KMC | 0° | 15° | 30° | 45° | 60° | 75° | 90° | 105° | 120° |
| 16.0 | 1.03 | 1.02 | 1.015 | 1.02 | 1.02 | 1.015 | 1.01 | 1.01 | 1.01 |
| 16.1 | 1.03 | 1.02 | 1.02 | 1.02 | 1.02 | 1.02 | 1.015 | 1.015 | 1.015 |
| 16.2 | 1.03 | 1.03 | 1.03 | 1.02 | 1.01 | 1.02 | 1.02 | 1.02 | 1.015 |
| 16.3 | 1.03 | 1.03 | 1.03 | 1.02 | 1.015 | 1.015 | 1.015 | 1.015 | 1.015 |
| 16.4 | 1.03 | 1.025 | 1.02 | 1.02 | 1.02 | 1.02 | 1.02 | 1.02 | 1.015 |
| 16.5 | 1.01 | 1.01 | 1.01 | 1.01 | 1.01 | 1.01 | 1.01 | 1.01 | 1.01 |
| 16.6 | 1.025 | 1.03 | 1.02 | 1.025 | 1.025 | 1.025 | 1.03 | 1.03 | 1.03 |
| 16.7 | 1.03 | 1.025 | 1.025 | 1.025 | 1.03 | 1.04 | 1.04 | 1.04 | 1.04 |
| 16.8 | 1.04 | 1.02 | 1.02 | 1.04 | 1.04 | 1.04 | 1.04 | 1.04 | 1.04 |
| 16.9 | 1.05 | 1.04 | 1.04 | 1.04 | 1.04 | 1.04 | 1.05 | 1.04 | 1.04 |
| 17.0 | 1.06 | 1.04 | 1.03 | 1.03 | 1.03 | 1.04 | 1.04 | 1.04 | 1.04 |
INVENTOR.
H. CLINTON DeWITT
BY
Arthur M. Collins
ATTORNEY United States Patent Office 3,138,769
Patented June 23, 1964

3,138,769
DRIVE MEANS FOR SECTORS OF STEP TWIST ROTARY JOINT
Henry Clinton De Witt, Basking Ridge, N.J., assignor, by mesne assignments, to the United States of America as represented by the Secretary of the Navy
Filed Sept. 28, 1962, Ser. No. 227,689
2 Claims. (Cl. 333—98)

This invention relates to waveguides for conducting ultra high frequency electric waves, and particularly to rotatable couplings for pivotally joining two such waveguides.

Often two waveguide sections must be connected in fluid tight relationship and yet permit one section to pivot with respect to the other. As an example, such connections are required at each of the trunnion points in an airborne radar antenna system to eliminate the necessity of mounting the heavy transmitter on a rapidly moving gimbal assembly.

The purpose of this invention is to provide an improved rotary coupling for waveguides having efficient electrical performance, maximum power transmission with low VSWR, minimum attenuation, minimum variation of VSWR with the angle of rotation, a small dimension, requiring a minimum of driving force, and providing long mechanical life and low torque characteristics while maintaining internal pressure.

The manner in which this is achieved will become clear when the following detailed description is read in conjunction with the accompanying drawings, in which:

FIG. 4 is also a perspective view but of the lower intermediate wafer.

FIG. 5 is an end view showing the positions of the wave cavities through the wafers after turning the rotatable portion 90° clockwise.

FIG. 6 is a table showing performance of the coupling at various angles of rotating and frequencies.

Figure 1:
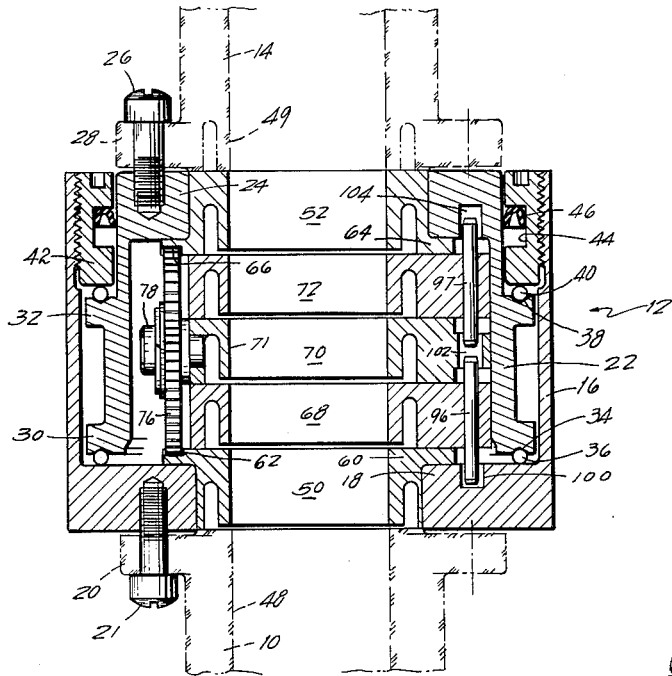
FIG. 1 is a longitudinal cross-sectional view of the invention showing its large differential gearing.

The embodiment illustrated is of the sector scan type for airborne radar antenna. It is designed to operate over an angle of 180°, since a full 360° rotation is not needed in these devices, and at a scan rate up to five scans per second. Physically, it is less than one and one-half inches long and two inches in diameter. Electrically, its design center frequency is 16.5 kmc. and it efficiently transmits energy in the 16–17 kmc. frequency range. In addition, the maximum VSWR over the design frequency range is no larger than 1:1.05 for a 120° scan, as the performance tabulations indicate in FIG. 6.

Referring now to the drawings for a detailed description, 10 is a vertically disposed, stationary waveguide which is connected by the rotary coupling of the invention, generally indicated at 12, to a rotatable waveguide 14 which receives and transmits wave-energy to a reflector, not shown. The rotary coupling 12 includes a plurality of axially aligned short waveguide members having the usual rectangular waveguide cavities, interconnecting those of the fixed and rotatable waveguides, 10 and 14, respectively, that are enclosed within a housing assembly.

One of the housing assembly elements is an outer housing 16, which is a hollow open ended cylinder, with a flange 18 protruding inwardly at its lower end. Flange 18 mates with a flange 20 on fixed waveguides 10 and is secured to it by bolts, like the one shown at 21.

Concentrically disposed within the fixed housing 16, there is a hollow, cylindrical inner or rotatable housing 22, also having an inwardly directed flange 24. This flange, 24, is at the upper end of the rotatable housing 22, and is secured by bolts 26 to a flange 28 in the rotatable waveguide 14. A flange 30 projects outwardly at the lower end of the rotatable housing, as does one, 32, at about its mid-point. The lower face of the lower flange 30 has an annular groove 34 which is a track for bearings 36 that ride on the inner face of the fixed or outer housings of flange 18. The upper end face of the intermediate flange 32 also has a groove 38 carrying bearings 40 which ride on the abutting end face of annular sleeve nut 42 threaded into the outer housing 16. This construction secures the inner or rotatable housing 22 to the outer or fixed housing 16 against axial movement, while, at the same time, permitting one to turn with respect to the other.

To prevent leakage through the joint formed between the housings 16 and 22, the sleeve nut 42 has an annular groove 44 in its inner peripheral wall carrying a cheveron-type gasket 46, that is, V-shaped in cross-section. The legs on gasket 46 are pointed inward toward the intermediate flange 32 on the rotatable housing 22, and bear against the bottom of groove 44 of the sleeve nut 42 and the outer peripheral wall of the rotatable housing 22. Fluid pressure entering between the legs of gasket 46 forces them outwardly, thereby effecting a fluid seal against leakage through the coupling.

The wave cavity 48 in the fixed waveguide 10 is connected to that, 49, in the rotatable waveguide 14 through five short axially aligned waveguides or wafers, 50, 52, 68, 70, and 72, having similar wave cavities.

The end wafers, 50 and 52, are fixed, as by press fitting, within the bores of the fixed and rotatable housings, 16 and 22, as integral portions of them. End wafer 50 has a circular, outward flange 60 at its upper end which overlies the end face of the flange or fixed housing 10. Grooves along its peripheral edge and on its upper surface define a ring gear 62. The end wafer 52, in the rotatable housing 22, is similarly constructed with a flange 64 which overlies the lower end face of the rotatable housing 22 and has a ring gear 66 in its lower end face.

Figure 3:
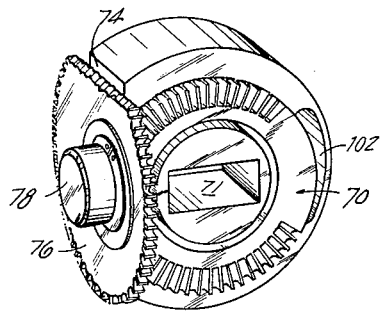
FIG. 3 is a perspective view of the center waveguide wafer.

Three short waveguides or intermediate wafers, 68, 70, and 72, are stacked between the end wafers 50 and 52. Each of these has a cylindrical outer surface for rotatable engagement with the inner wall of the rotatable housing 52, and has external axial portions removed. The portion removed from the central wafer 70, FIG. 3, is opposite the short wall forming its waveguide cavity 71 and defines a flat longitudinal surface 74 to which a wheel gear 76 is rotatably secured by a pin 78. Gear 76 is of such diameter that its teeth mesh with the ring gears, 62 and 66, FIG. 1, formed on the end wafers 50 and 52. Ring gears, 80 and 82, are cut in both end faces of center wafer 70, FIG. 2, similar to those in the end wafers 50 and 52.

Two axial portions are removed from the outer surface of the lower intermediate wafer 68, FIG. 4, oppposite the narrow side of its wave cavity 84 creating flat surfaces 86 and 88 having an external angle between them large enough so that the wafer may be turned respectively the central wafer 70 without binding on its wheel gear, 76, which normally lies opposite the faces 86 and 88. An axial slot 90 penetrates the lower intermediate wafer 68 opposite the long side of its wave cavity 84 in which a wheel gear 92, of smaller diameter than wheel gear 76 on the center wafer 70, is rotatably mounted and meshed with the lower ring gear 80 in the end face of center wafer 70 and with ring gear 62 on fixed end wafer 50. Opposite the other long side of the wave cavity 84 a similar slot 90 with gear 92' is provided and similarly meshed with ring gears 80 and 62.

Figure 2:
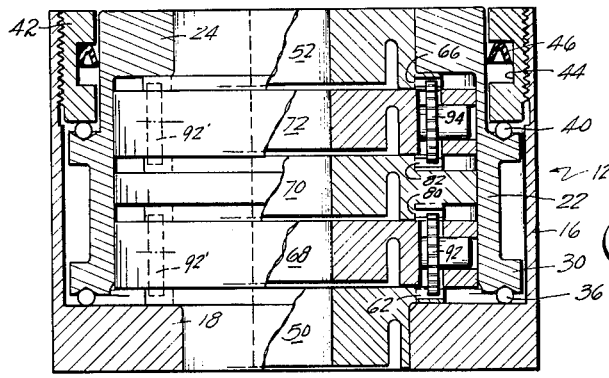
FIG. 2 is a longitudinal sectional view with some parts broken away showing two smaller differentials that are used.

The upper intermediate wafer 72 is identical to the lower intermediate wafer 68 and has gear wheels, one of which is shown at 94 in FIG. 2, mounted in slots, similar, to that of wafer 68. However, its gear wheels 94 are meshed with the ring gear 82 formed in the upper end face of the central wafer 70 and ring gear 66 in the rotatable end wafer 52.

This arrangement of wafers with their gears forms three overlaying differentials: A large or first differential between the center intermediate wafer 70 and the end wafers 50 and 52 in the inner housings 16 and 22; a second smaller differential between the center wafer 70, fixed housing 16, and the lower intermediate wafer 68; and a third differential between the center wafer 70, the rotatable or inner housing 22, and the upper intermediate wafer 72. The mechanical action of the differentials is to move the wafer carrying the gear wheel one-half the angular distance that the wafers between which it lies are moved relative to each other. Thus, the center wafer 70 moves one-half as far as the rotatable housing 22 moves with respect to the fixed housing 16. The lower intermediate wafer 68 moves one-half as far as the center wafer 70 moves respectively the fixed housing 16. And the upper intermediate wafer 72 is moved one-half the distance that the rotatable housing 22 moves relative the center wafer 70. The wafers move in the same direction and in the above proportion to the movement of the driven member, which is the inner or rotatable housing 22. The angular movement of the wafers causes the wave cavity through the coupling to have the appearance of a short step twist section, as shown in FIG. 5. The wafers fan-out, so that the angles between adjacent wafers are all equal. In FIG. 5 turning the rotatable waveguide clockwise 90° formed four 22½ angles between adjacent wafers. Likewise, if it were turned 120° there would be four 30° angles.

Choke cavities are furnished in each wafer which communicates with the wave cavity to cancel reflections due to shifting of the wafers. The axial thickness of the wafers is substantially one-quarter wave length with allowances for the choke undercuts and rotation clearance between the wafers. To eliminate the possibility of applying destructive forces when attempts are made to turn the assembly beyond the design angle, integral stops between wafers are included. The lower and upper intermediate wafers 68 and 72 each carry fixed pins 96 and 97 respectively, axially extending beyond their end faces into slots in the adjacent wafers. Pin 96 in the lower wafer 68 has one end seated in an arcuate slot 100 in the fixed end wafer 50 and its upper end in an arcuate slot 102 in the lower end face of the center wafer 70. Similarly, pin 97 in the upper intermediate wafer 72 terminates in slot 102 in the center wafer 70 and a slot 104 in the upper or rotatable end wafer 52. Stopping is effected, as shown in FIG. 5, by the pin-ends abutting the terminal end faces of the slots with turning of the wafers.

From tests, the observation has been made that the assembly has a life expectancy of over two million cycles, that attenuation is insignificant, and that it readily meets the 1:1.05 requirement over the frequency range of 16–17 kmc. in increments of 15° over a 120° scan as table FIG. 6 shows.

Obviously many modifications and variations of the present invention are possible in the light of the above teachings. It is therefore to be understood that within the scope of the appended claims the invention may be practiced otherwise than as specifically described.

What is claimed is:

1. A device for joining a fixed waveguide to an axially oscillating or rotatable waveguide comprising an outer housing adapted to be secured at one end to the end of said fixed waveguide, a rotatable housing concentrically disposed within said fixed housing and adapted to be secured at one end to the end of said rotatable housing, said rotatable housing having a cylindrical inner surface; an end wafer secured at the end of each of said housings, a ring gear formed on the end face of each of said end wafers within said rotatable housing, three axially aligned intermediate wafers rotatably disposed within said rotatable housing interconnecting the wave cavities in said end wafers, said intermediate wafers having a cylindrical outer surface adapted for rotatable engagement with the inner surface of said rotatable housing, and the center one of said intermediate wafers having portions removed defining a flat longitudinal surface; a gear wheel rotatably secured on said other intermediate wafers having portions removed so that they may be turned with respect to the center intermediate wafer without binding on its gear wheel, a ring gear formed in each of the end faces of said center intermediate wafer, each of the other intermediate wafers having an axial slot penetrating their end faces, a gear wheel rotatably secured in said slot in each of the other intermediate wafers and meshed with a ring gear on said center intermediate wafer and on one end of said end wafers, and rotation limiting means including arcuate slots in the end of said end and center intermediate wafers and a pin fixed within each of said other intermediate wafers having an end disposed in said slot in said end wafer and the other end in the slot in said center intermediate wafer, the gearing ratios formed being such that any wafer carrying a gear is moved one-half the angular distance that the wafers between which it lies are moved relative each other.

2. The device of claim 1 including means securing said housings against axial movement while permitting relative rotative movement comprising a flange on the external surface of one of said housings and a sleeve nut threaded into the other of said housings for engagement with said flange, said nut having an annular groove and a gasket within said groove for sealing against the flow of fluid pressure between said one housing and said nut.

References Cited in the file of this patent

UNITED STATES PATENTS

| | | |
|---|---|---|
| 2,430,443 | Aamodt et al. | Nov. 11, 1947 |
| 2,473,443 | Ragan | June 14, 1949 |
| 2,529,381 | Frear | Nov. 7, 1950 |
| 2,584,399 | Preston | Feb. 5, 1952 |
| 2,947,955 | Bellamy et al. | Aug. 2, 1960 |
| 2,969,513 | Brennault | Jan. 24, 1961 |
| 3,001,159 | Hilsinger | Sept. 19, 1961 |